(12) United States Patent
Maruo et al.

(10) Patent No.: US 6,757,909 B1
(45) Date of Patent: Jun. 29, 2004

(54) INTERNET SET-TOP BOX HAVING AN IN-BAND TUNER AND CABLE MODEM

(75) Inventors: Jun Maruo, Tokyo (JP); Atsushi Kagami, Tokyo (JP)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 0 days.

(21) Appl. No.: 09/473,625

(22) Filed: Dec. 29, 1999

(51) Int. Cl.[7] .............................................. H04N 7/173
(52) U.S. Cl. ........................ 725/111; 380/210; 725/25; 725/31; 725/110; 725/109; 725/2; 709/217; 709/218; 709/219
(58) Field of Search ....................... 725/2, 31, 109–111, 725/25, 39; 709/217–219; 380/210, 266

(56) References Cited

U.S. PATENT DOCUMENTS

| | | | | |
|---|---|---|---|---|
| 5,485,221 A | * | 1/1996 | Banker et al. | 348/563 |
| 5,818,935 A | * | 10/1998 | Maa | 380/200 |
| 5,850,218 A | * | 12/1998 | LaJoie et al. | 725/45 |
| 5,892,910 A | | 4/1999 | Safadi | 395/200.47 |
| 5,896,414 A | | 4/1999 | Meyer et al. | 375/222 |
| 5,901,339 A | * | 5/1999 | Saito | 725/5 |
| 6,025,837 A | * | 2/2000 | Matthews, III et al. | 725/109 |
| 6,144,402 A | * | 11/2000 | Norsworthy et al. | 725/109 |
| 6,154,206 A | * | 11/2000 | Ludtke | 725/25 |
| 6,317,885 B1 | * | 11/2001 | Fries | 725/109 |
| 6,374,404 B1 | * | 4/2002 | Brotz et al. | 725/46 |
| 6,407,998 B1 | * | 6/2002 | Polit et al. | 370/365 |
| 6,477,179 B1 | * | 11/2002 | Fujii et al. | 370/466 |

OTHER PUBLICATIONS

Advanced Television Systems Committee; "Program and System Information Protocol for Terrestrial Broadcast and Cable"; ATSC Standard Doc. A/65; Dec. 23, 1997.

* cited by examiner

Primary Examiner—Andrew Faile
Assistant Examiner—Ngoc Vu
(74) Attorney, Agent, or Firm—Wagner, Murabito & Hao LLP (57) ABSTRACT

An apparatus and method thereof for communicating a scramble key (for descrambling scrambled digital signals) and service information (used in an electronic programming guide) to an intelligent transceiver (e.g., a set-top box) using a bi-directional digital broadcast system. The intelligent transceiver includes an in-band tuner adapted to receive from the digital broadcast system in-band digital signals comprising audio content and video content. The intelligent transceiver also includes a second tuner adapted to send and receive a scramble key over the World Wide Web via a cable modem. In one embodiment, the in-band digital signals received by the in-band tuner also contain service information. In another embodiment, the digital signals received by the second tuner via the cable modem also contain service information. Thus, the scramble key is sent over the World Wide Web and is received by the intelligent transceiver using a cable modem. The service information is sent either with the in-band signal or over the World Wide Web, and is received via the in-band tuner or the cable modem, respectively. Therefore, the broadcast system does not need to use out-of-band signals. Accordingly, the intelligent transceiver does not require an out-of-band tuner and demodulator to receive the scramble key and service information, and so these devices can be omitted from the intelligent transceiver, thereby simplifying the transceiver and reducing costs.

22 Claims, 11 Drawing Sheets

INTERNET SET-TOP BOX HAVING AN IN-BAND TUNER AND CABLE MODEM

BACKGROUND OF THE INVENTION

1. Field of the Invention

The present invention relates to the field of intelligent transceivers such as set-top boxes, in particular bi-directional set-top boxes. More specifically, the present invention pertains to a modular set-top box architecture in which the devices needed for bi-directional communication are substantially located in a single functional block.

2. Background Art

Digital broadcast systems include direct broadcast digital satellite systems, interactive World Wide Web access systems, and digital cable systems. Digital broadcasting provides a number of advantages to subscribers, such as variety and flexibility of programming, useful and comprehensive support services (such as detailed electronic programming guides), and superior audio and video quality. Subscribers receive broadcast digital signals via set-top boxes or other similar consumer electronic equipment (generally, a "transceiver") located in the subscriber's home. In an intelligent set-top box, information and instructions associated with receiving and processing digital broadcast signals are stored in a memory unit of the set-top box and executed by a processor. With a bi-directional set-top box, in addition to receiving broadcast signals, a subscriber can transmit messages to the digital broadcast system operator (also referred to as a Multiple System Operator, MSO).

Using a bi-directional set-top box, a subscriber can select a premium service offered by the MSO, such as a pay-per-view event or movie, and the subscriber's selection as well as information needed for billing purposes are transmitted to the MSO. In a common implementation, a "smart card" stores the information needed for billing, and on a periodic basis (perhaps once per month) an automatic connection is made between the transceiver and the MSO so that the billing information can be transmitted to the MSO. To prevent unauthorized use, MSOs typically broadcast a scrambled signal. The signal is descrambled in the transceiver using a "scramble key" provided by the MSO.

A set-top box performs a number of functions associated with processing a broadcast digital signal. In a typical prior art embodiment, the digital signal received by the set-top box is scrambled, and the signal is descrambled by the set-top box before further processing occurs. The descrambled signal is then encrypted within the set-top box in order to prevent unauthorized duplication and use ("pirating") of the descrambled signal. Once the encrypted signal is at a more secure location within the set-top box, it is decrypted for further processing. The digital signal is typically in a compressed data format such as MPEG (Moving Picture Experts Group) for video signals and/or Dolby AC3 for audio signals, and so the decrypted signal is decoded (uncompressed) by the set-top box. After decoding, the audio content and video content contained in the digital signal are processed so that it can be viewed and/or listened to by the subscriber using, for example, a television set.

Figure 1:
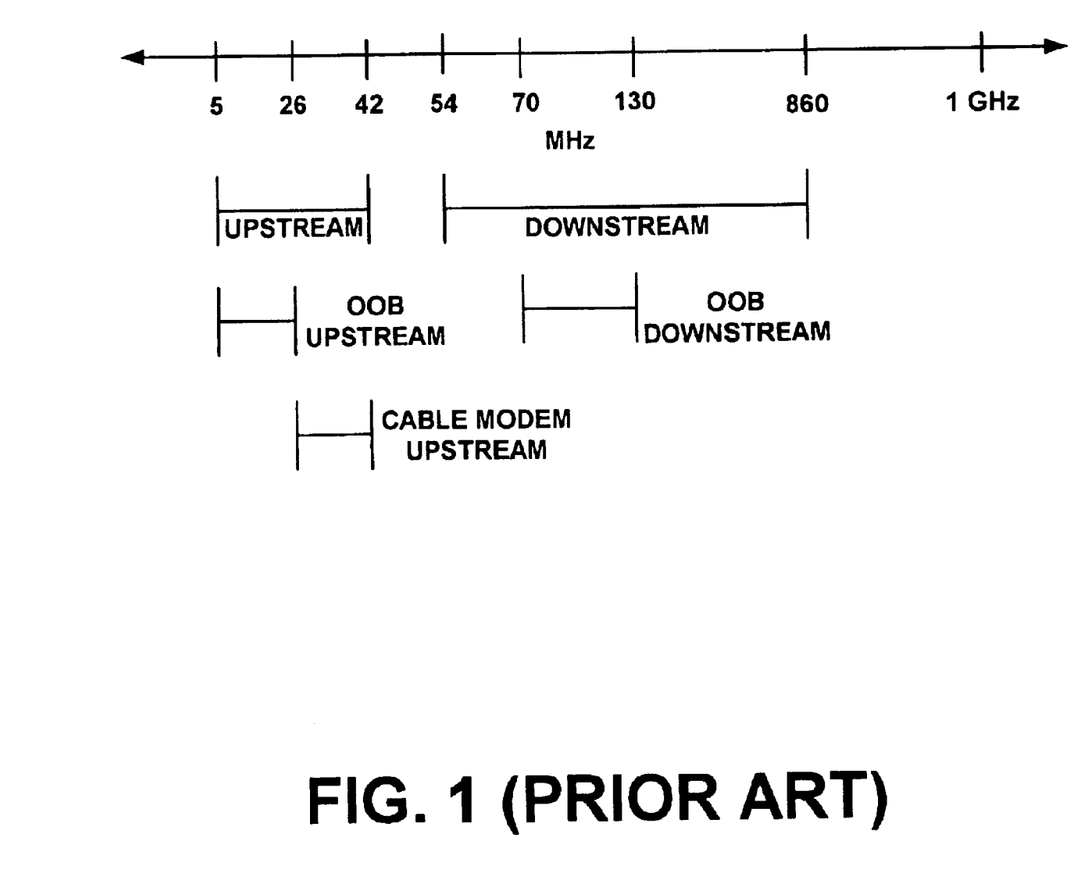
FIG. 1 is an illustration of the frequencies associated with different types of broadcast signals used in the prior art.

Prior Art FIG. 1 is an illustration of the various frequencies associated with different types of broadcast signals. The frequencies in the range of approximately 5–42 MHz are known as "upstream" signals, and the frequencies in the range of approximately 54–860 MHz are known as "downstream" signals. From the perspective of a set-top box, an upstream signal is transmitted and a downstream signal is received.

Within the upstream range, the range of frequencies from approximately 5–26 MHz are known as "out-of-band (OOB) upstream," and the range of signals from approximately 26–42 MHz are known as "cable modem upstream." Within the downstream range, the range of frequencies from approximately 70–130 MHz are known as "out-of-band downstream."

The OOB upstream range is used by the set-top box to send billing information, for example, to the broadcast system operator or MSO. The cable modem upstream range is used by the set-top box for communicating with the World Wide Web, for sending e-mail, and the like. The in-band downstream range is used by the set-top box for receiving audio and video content. The OOB downstream range is used by the set-top box for receiving service information (e.g., electronic programming guide information, EPG) and for receiving the scramble key used by the set-top box to descramble a scrambled broadcast digital signal. An EPG typically provides information such as the names of programs, the time and channel associated with each program, and extended text tables with information regarding the subject matter of the program, actors names, and the like. An EPG generally is formatted as a table, with channels along one axis of the table, times along the other axis, and the name of the program at the intersection of the time and channel.

Current broadcast systems typically need to support both analog and digital television, and so the in-band downstream range is used for carrying both analog and digital audio and video (A/V) content. However, the bandwidth of the in-band downstream range is too narrow to accommodate the service information and scramble key in addition to the analog and digital A/V content. As a result, the OOB downstream range is used to carry the service information and scramble key.

Figure 2:
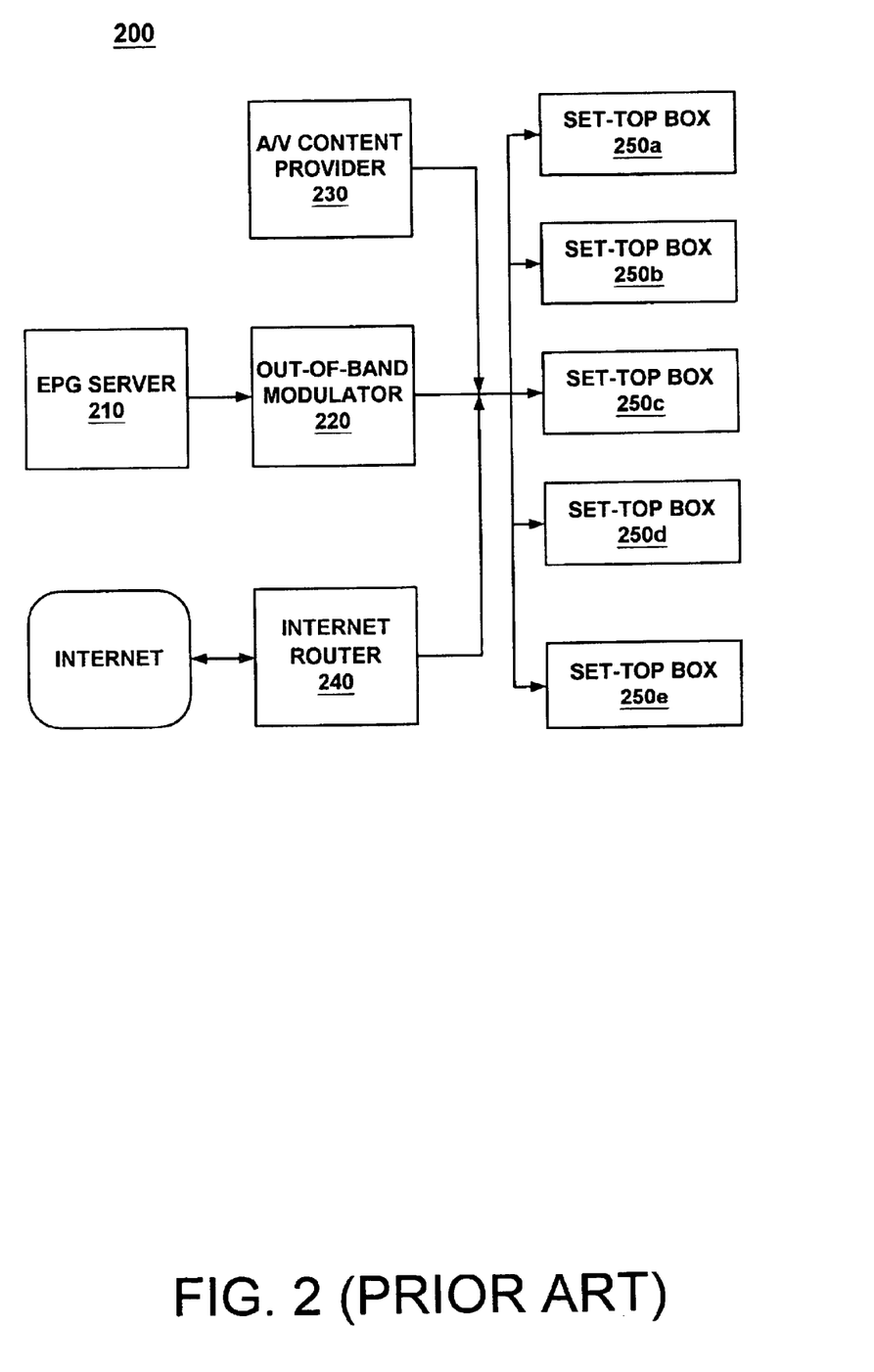
FIG. 2 is a block diagram of an exemplary prior art broadcast system.

Prior Art FIG. 2 is a block diagram showing the architecture of a typical broadcast system 200. A/V content for broadcast system 200 is provided by A/V content provider 230. The A/V content is provided in the in-band downstream range to the many set-top boxes in broadcast system 200 (e.g., set-top boxes 250a, 250b, 250c, 250d and 250e). Depending on the type of system, broadcast system 200 may utilize a terrestrial broadcast (e.g., a wireless broadcast) or a terrestrial line (e.g., cable).

EPG server 210 provides the service information and scramble key for broadcast system 200, although there may be a different source for this information in other implementations. The service information and scramble key are forwarded to out-of-band modulator 220 and then broadcast in the OOB downstream range to set-top boxes 250a, 250b, 250c, 250d and 250e.

Set-top boxes 250a, 250b, 250c, 250d and 250e may also be communicatively coupled to the Internet via Internet router 240. Communication with the Internet typically uses Internet Protocol (IP).

Figure 3:
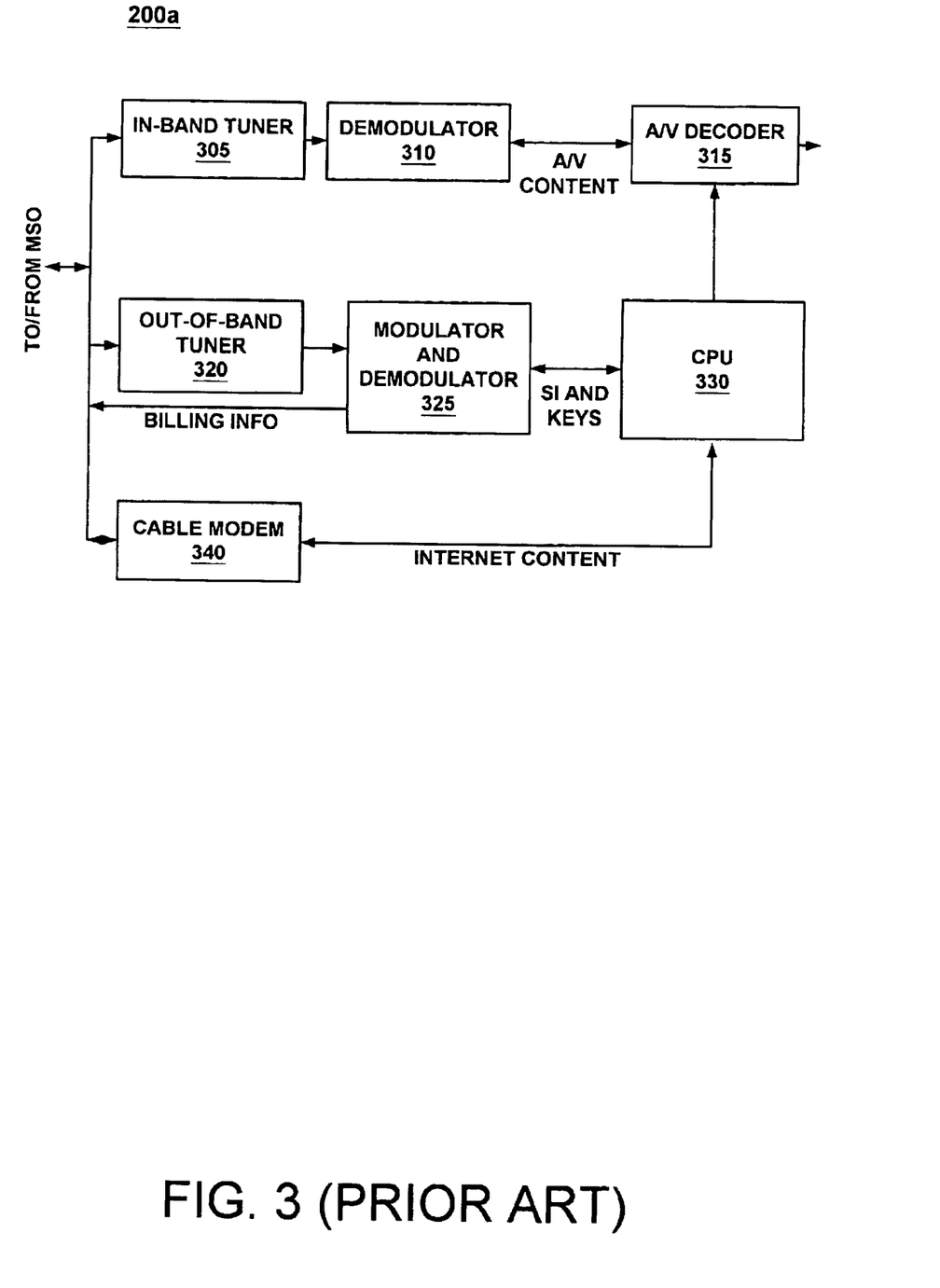
FIG. 3 is a block diagram of an exemplary intelligent transceiver (e.g., a set-top box) that can be used to receive broadcast signals from the broadcast system of FIG. 2.

Prior Art FIG. 3 is a block diagram illustrating an exemplary embodiment of an intelligent transceiver (e.g., set-top box 250a) used in broadcast system 200 of FIG. 2. Central processing unit (CPU) 330 contains a processor and memory (not shown) for processing information and instructions used by set-top box 250a.

With reference to FIG. 2 and FIG. 3, set-top box 250a includes an in-band tuner 305 for receiving the in-band downstream signals from A/V content provider 230. In-band tuner 305 typically receives fixed frequency broadcast channels. The in-band downstream signal is demodulated by demodulator 310, then forwarded to A/V decoder 315 for decoding, as described above. From A/V decoder 315, the decoded signal is sent to a graphics block (not shown) for processing so that it can be displayed and/or listened to.

Continuing with reference to FIG. 2 and FIG. 3, set-top box 250a also includes an out-of-band tuner 320 for receiving the out-of-band downstream signal containing the scramble key and service information (SI). The out-of-band downstream signal is demodulated by modulator/demodulator 325. The scramble key can be applied to the in-band downstream signal to descramble that signal and retrieve the A/V content (when the in-band downstream signal is scrambled, e.g., for a pay-per-view movie or event). The service information (if compressed) is decoded by A/V decoder 315, then sent to a graphics block for processing so that the electronic programming guide can be displayed. Messages from set-top box 250a, such as a selection of a pay-per-view movie or event and the associated billing information, is modulated using modulator/demodulator 325 and sent to the MSO in the out-of-band upstream range.

Set-top box 250a further includes cable modem 340 to receive the IP data signals (e.g., data packets) retrieved from the Internet and also to send IP data signals to the Internet, including electronic mail. Cable modem 340 typically can also receive in-band signals for non-broadcast information (e.g., variable frequency broadcast channels controlled by the MSO).

A disadvantage of broadcast system 200 is that it requires the use of in-band signals, out-of-band signals, and IP signals in order to send A/V content, service information, a scramble key, electronic mail, etc. Accordingly, it is necessary for a set-top box (e.g., set-top box 250) to include an in-band tuner 305, an out-of-band tuner 320, and a cable modem 340. As a result, additional complexity is introduced into broadcast system 200 and set-top box 250. Consequently, manufacturers of set-top boxes face increased development and fabrication costs, and MSOs face higher costs associated with running and maintaining a broadcast system. These costs are reflected in the prices charged to consumers. Clearly, for the benefit of the manufacturer and the MSO as well as the consumer, it is desirable to minimize these costs.

SUMMARY OF THE INVENTION

Accordingly, what is needed is an apparatus and/or method that can reduce the costs of a set-top box and a broadcast system, in particular with regard to supporting the use of in-band signals, out-of-band signals and Internet Protocol (IP) data packets. What is also needed is an apparatus and/or method that can address the above need and that can continue to provide the audio/video content, service information, scramble key, and Internet access currently provided by the in-band signals, out-of-band signals and Internet Protocol data packets.

The present invention includes an apparatus and method thereof that satisfy the above needs. These and other advantages of the present invention not specifically mentioned above will become clear within discussions of the present invention presented herein.

The present invention pertains to an apparatus and method thereof for communicating a scramble key (for descrambling scrambled digital signals) and service information (such as that used in an electronic programming guide) to an intelligent transceiver (e.g., a set-top box) using a bi-directional digital broadcasting system (e.g., satellite systems, interactive World Wide Web access systems, and digital cable systems). The intelligent transceiver includes an in-band tuner adapted to receive from the digital broadcast system in-band digital signals comprising audio content and video content. The intelligent transceiver also includes a second tuner adapted to receive a scramble key over the World Wide Web via a cable modem.

In one embodiment, the in-band digital signals received by the in-band tuner also contain service information (including electronic programming guide information). In another embodiment, the digital signals received by the second tuner via the cable modem also contain service information (including electronic programming guide information). Thus, the scramble key is sent over the World Wide Web and is received by the intelligent transceiver using a cable modem. The service information (including electronic programming guide information) is sent either with the in-band signal or over the World Wide Web and is received via the in-band tuner or the cable modem, respectively.

In one embodiment, the digital signals sent over the World Wide Web are communicated using Internet Protocol.

In another embodiment, an authentication signal is sent via the cable modem to indicate that a valid intelligent transceiver authorized to receive the scramble key is connected to the digital broadcast system.

In yet another embodiment, billing information (pertaining to a subscriber's use of a premium service such as a pay-per-view movie or event, for example) is sent via the cable modem to the digital broadcast system operator. The cable modem can also be used for Internet access and to send and receive electronic mail.

Therefore, in accordance with the present invention, it is not necessary for the broadcast system to use out-of-band signals to send service information and a scramble key. Consequently, the intelligent transceiver does not require an out-of-band tuner and demodulator to receive the service information and scramble key, and so these devices can be omitted from the intelligent transceiver. As a result, broadcast systems can be simplified, thereby reducing costs. In addition, the manufacture of the intelligent transceiver is facilitated and the cost of the intelligent transceiver can be reduced.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

PRIOR ART

PRIOR ART

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within an intelligent electronic media device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a consumer electronic media device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving" or "sending" or "communicating" or the like, refer to the action and processes (e.g., process 800 of FIG. 8) of an electronic device such as a microcontroller or similar electronic computing device (e.g., dedicated or embedded computer system) that manipulates and transforms data. The data are represented as physical (electronic) quantities within the electronic device's registers and memories and is transformed into other data similarly represented as physical quantities within the electronic device memories or registers or other such information storage, transmission, or display screens.

Figure 4:
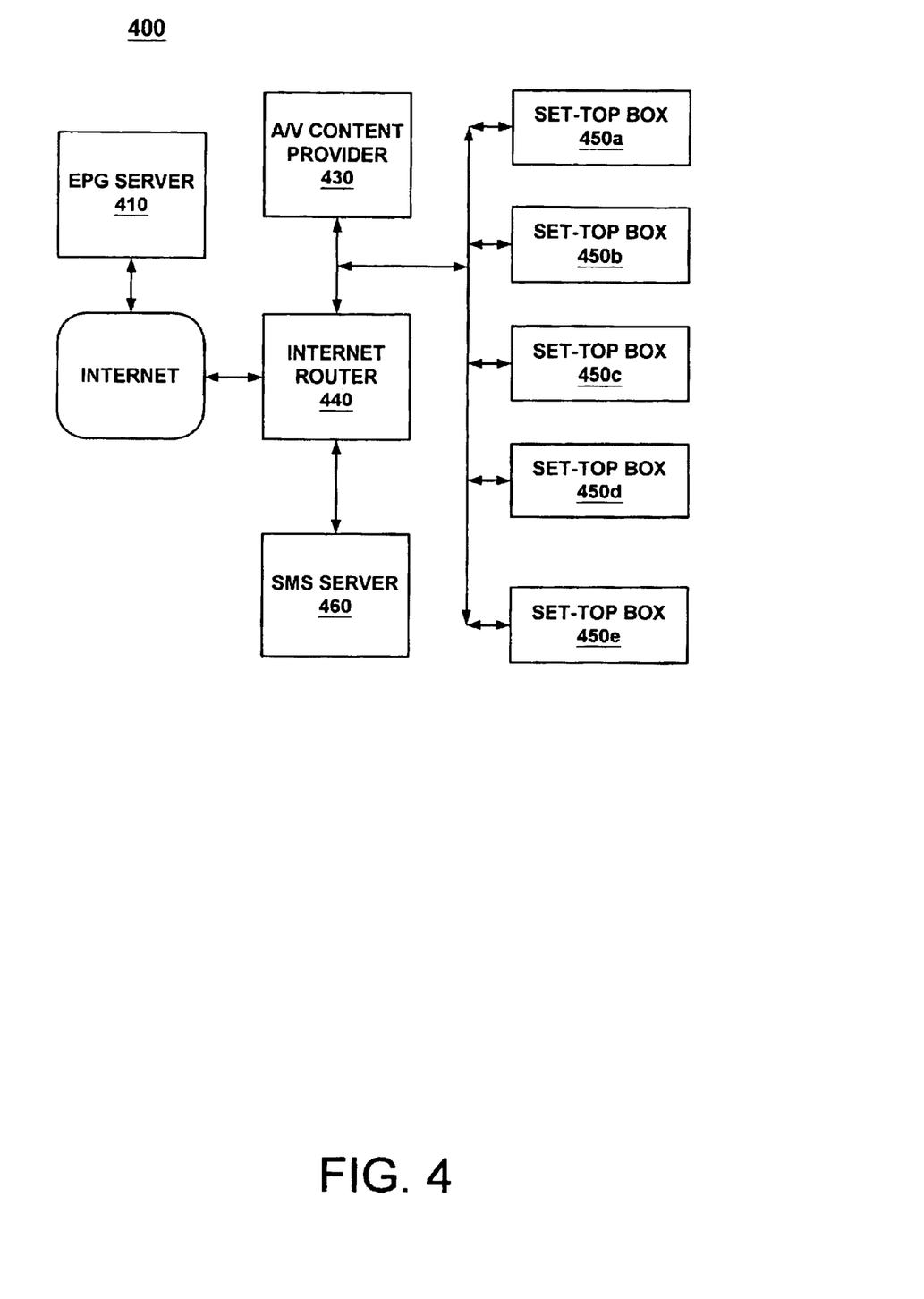
FIG. 4 is a block diagram of an exemplary digital broadcast system in accordance with one embodiment of the present invention.

FIG. 4 is a block diagram providing an overview of bi-directional digital broadcast system 400 in accordance with one embodiment of the present invention. Broadcast system 400 includes a plurality of intelligent transceivers; in the present embodiment, the intelligent transceivers are set-top boxes (e.g., set-top boxes 450*a*, 450*b*, 450*c*, 450*d* and 450*e*). However, it is appreciated that the present invention may be utilized with other intelligent transceivers, such as computer systems.

Audio/video (A/V) content for broadcast system 400 is provided by A/V content provider 430 (e.g., a broadcast system operator or Multiple System Operator, MSO). In various embodiments, A/V content provider 430 may utilize a terrestrial broadcast (e.g., a wireless broadcast), a terrestrial line (e.g., cable), a satellite broadcast, or an Internet connection over the World Wide Web (not shown). The A/V content is provided in the in-band downstream range to the set-top boxes in broadcast system 400 (e.g., set-top boxes 450*a*, 450*b*, 450*c*, 450*d* and 450*e*).

In the present embodiment, set-top boxes 450*a*, 450*b*, 450*c*, 450*d* and 450*e* are communicatively coupled to the Internet via Internet router 440. In various embodiments, the connection to the Internet may be a wireless connection, a connection over a telephone line, a connection over a cable, or the like. In one embodiment, communication with the Internet uses Internet Protocol (IP).

In the present embodiment, electronic programming guide (EPG) server 410 provides the service information (including information to generate an EPG as well as EPG updates) for broadcast system 400. In one embodiment, the service information and updates are sent over the World Wide Web (e.g., the Internet) to set-top boxes 450*a*, 450*b*, 450*c*, 450*d* and 450*e* via Internet router 440. In this embodiment, the service information is communicated using IP data packets. In another embodiment, the service information and updates are provided by A/V content provider 430 using the in-band downstream signal. Accordingly, one portion of the in-band downstream frequency range is used for service information, and another portion is used for A/V content. For example, frequencies above approximately 600 MHz can be used for service information, and frequencies below approximately 600 MHz can be used for A/V content. Furthermore, for each subscriber, a particular frequency can be specified and used to provide personalized service information.

In the present embodiment, the scramble key (e.g., for descrambling a scrambled broadcast digital signal) is provided by Subscriber Management System (SMS) server 460. In accordance with the present invention, the scramble key is sent over the World Wide Web (e.g., the Internet) to set-top boxes 450*a*, 450*b*, 450*c*, 450*d* and 450*e* via Internet router 440. In one embodiment, the scramble key is communicated using IP data packets. In another embodiment, the scramble key as well as the service information are provided by a single server computer system via the Internet.

Thus, in accordance with one embodiment of the present invention, the scramble key is sent from broadcast system 400 to set-top boxes 450*a*, 450*b*, 450*c*, 450*d* and 450*e* over the Internet (World Wide Web) using IP data packets. In one embodiment, the service information and updates are also sent over the Internet using IP data packets. In another embodiment, the service information and updates are sent using in-band downstream digital signals. A/V content is also sent using in-band downstream digital signals. Therefore, the present invention eliminates the need to use out-of-band signals to send service information and the scramble key from broadcast system 400 to set-top boxes 450*a*, 450*b*, 450*c*, 450*d* and 450*e*. By eliminating the need to use the out-of-band signal for the service information and scramble key, the complexity of a broadcast system architecture can be reduced in accordance with the present invention, reducing associated costs for the MSO and ultimately for the consumer. As will be seen, set-top box designs can also be simplified by removing the out-of-band tuner, further reducing consumer costs by reducing development and manufacturing costs for the set-top box manufacturer.

Figure 5A:
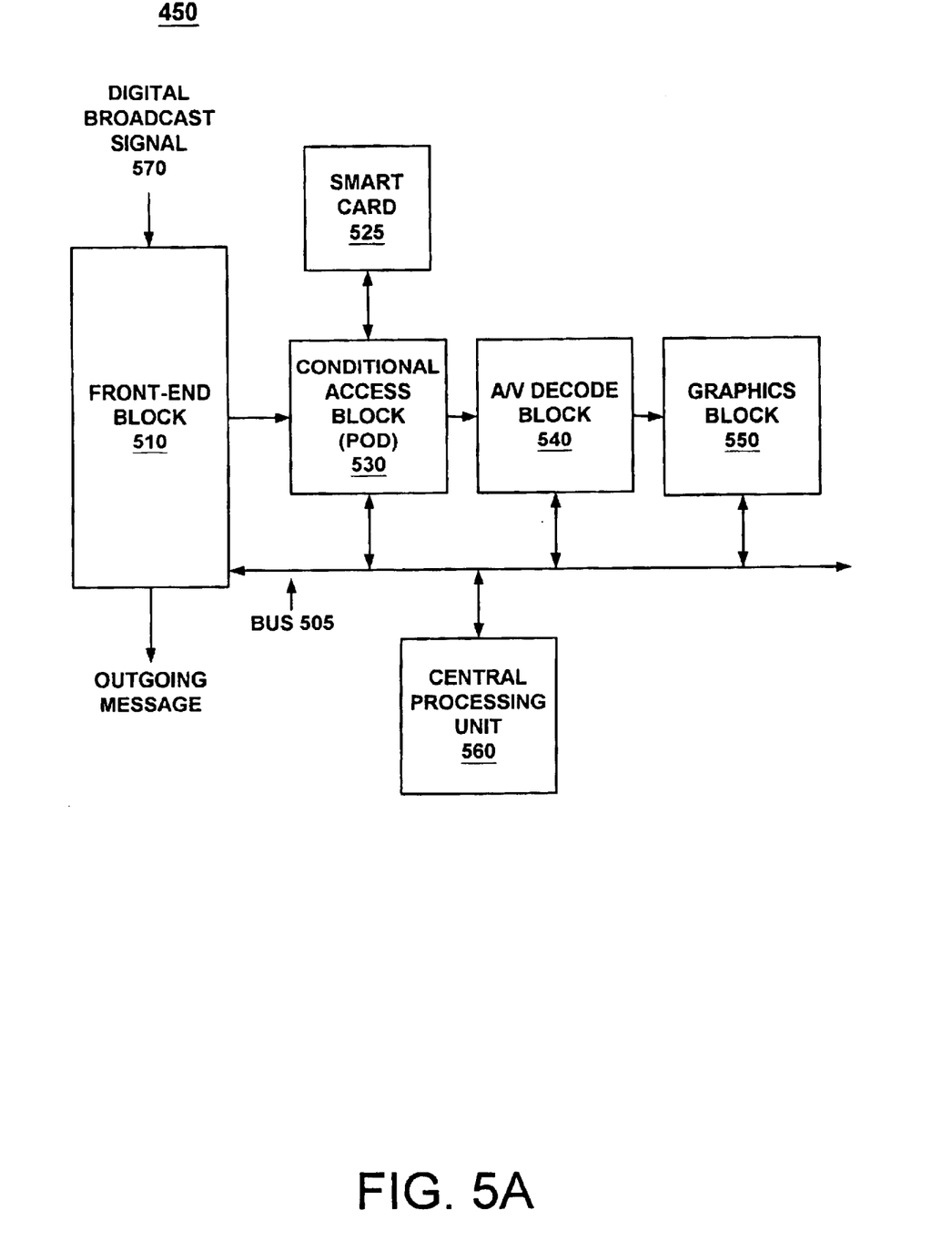
FIG. 5A is a block diagram of one embodiment of an intelligent transceiver upon which embodiments of the present invention may be practiced.

FIG. 5A is a block diagram of one embodiment of an intelligent bi-directional transceiver 450 (e.g., a set-top box) upon which embodiments of the present invention may be practiced. In the present embodiment, transceiver 450 includes front-end block 510 coupled to bus 505, conditional access block 530 coupled to front-end block 510 and bus 505, audio/video (A/V) decode block 540 coupled to conditional access block 530 and bus 505, graphics block 550 coupled to A/V decode block 540 and bus 505, and central processing unit 560 coupled to bus 505.

Conditional access block 530, also referred to as a point of deployment (POD) or an interface card, is adapted to receive smart card 525. Bus 505 is an internal address/data bus for communicating digital information between the functional blocks of transceiver 450. In one embodiment, bus 505 is a high bandwidth bus, for example a Peripheral Component Interconnect (PCI) bus, capable of communicating A/V data between the modularized blocks 510, 530, 540, 550 and 560.

Transceiver 450 receives digital broadcast signal 570 from a digital broadcast system (e.g., broadcast system 400 of FIG. 4). As a bi-directional set-top box, in addition to receiving digital broadcast signal 570, transceiver 450 can transmit messages to the digital broadcast system operator (e.g., an MSO). For example, when a subscriber selects a premium service offered by the MSO, such as a pay-per-view event or movie, the subscriber's selection and any billing information can be transmitted to the MSO. Transceiver 450 can also be used for Internet communications, electronic mail ("e-mail"), and the like.

With reference still to FIG. 5A, digital broadcast signal 570 is a media signal comprising audio and video content. Digital broadcast signal 570 can be delivered to transceiver 450 using any of the various mechanisms currently in use or envisioned, such as a terrestrial line (e.g., a cable system), the World Wide Web (e.g., a connection to the Internet), or a wireless transmission (e.g., a satellite broadcast). In accordance with the present invention, a number of different digital broadcast signal formats in use or envisioned can be used, such as the Advanced Television Systems Committee (ATSC) digital television format.

In the present embodiment of the present invention, front-end block 510 contains an in-band tuner (not shown) for receiving an in-band transmission from the digital broadcast system (e.g., broadcast system 400 of FIG. 4). Front-end block 510 also includes a second tuner (e.g., a Multiple Cable Network System Forward Application Tuner, not shown) coupled to a cable modem or similar device (not shown) for sending and receiving information to and from the World Wide Web, for sending and receiving e-mail, and for exchanging information with the digital broadcast system. Additional information is provided in conjunction with FIG. 6 and FIG. 7.

With reference still to FIG. 5A, transceiver 450 receives A/V content via the in-band transmission using the in-band tuner. In accordance with the present embodiment of the present invention, transceiver 450 receives service information and the scramble key via the World Wide Web (e.g., the Internet) using the second tuner. Accordingly, one portion of the in-band downstream range is used for service information, and another portion is used for A/V content. For example, frequencies above approximately 600 MHz can be used for service information, and frequencies below approximately 600 MHz can be used for A/V content. Furthermore, for each subscriber, a particular frequency can be specified and used to provide personalized service information.

In one embodiment, an authentication signal is sent from front-end block 510 (specifically, via the cable modem) to the MSO to indicate that a valid set-top box is connected to broadcast system 400. That is, the authentication signal is used to indicate that intelligent transceiver 450 is the correct and authorized recipient of the scramble key, thereby discouraging theft of the scramble key at the cable modem outlet.

In an alternate embodiment, transceiver 450 receives service information via the in-band transmission using the in-band tuner, instead of over the World Wide Web using the cable modem and the second tuner.

In one embodiment, front-end block 510 also includes a device (e.g., a modem) that allows a telephone or digital subscriber line (DSL) connection to be made to the World Wide Web so that bi-directional communications, including e-mail, can occur over the Internet.

Thus, in accordance with the present invention, the service information and the scramble key are not received by transceiver 450 from broadcast system 400 (FIG. 4) in an out-of-band signal, and thus the out-of-band signal is not necessary. Instead, the scramble key is received by transceiver 450 from broadcast system 400 over the Internet (World Wide Web). In one embodiment, the service information is also received by transceiver 450 from broadcast system 400 over the Internet. In another embodiment, the service information is received by transceiver 450 in an in-band downstream digital signal sent from broadcast system 400. A/V content is also received in an in-band downstream digital signal. By eliminating the out-of-band signal, set-top box design can be simplified by omitting the out-of-band tuner, thereby reducing consumer costs as well as development and manufacturing costs for the set-top box manufacturer.

Continuing with reference to FIG. 5A, in the present embodiment, central processing unit 560 contains a processor (not shown) for processing information and instructions. Central processing unit 560 also may contain random access memory, read only memory, one or more caches, a flash memory and the like (not shown) for storing information and instructions.

Smart card 525 stores information needed by a cable system operator or digital broadcast system operator (e.g., an MSO) to bill a subscriber for services used by the subscriber (for example, the viewing of a pay-per-view movie or event). Typically, smart card 525 also implements the scramble key provided by the MSO that is used to descramble digital broadcast signal 570 (if the signal is scrambled). In the present embodiment, smart card 525 is inserted into conditional access block 530; however, it is appreciated that in other embodiments smart card 525 may be coupled in a different manner to transceiver 450 (for example, it may be inserted into either front-end block 510 or A/V decode block 540). Using the scramble key from smart card 525, conditional access block 530 descrambles digital broadcast signal 570.

Because digital broadcast signal 570 has been descrambled, the signal must be encrypted in order to prevent its unauthorized use and duplication. In the present embodiment, conditional access block 530 contains an encryption engine (not shown) that encrypts digital broadcast signal 570. In one embodiment, the encryption engine uses a well-known DES ECB (Data Encryption Standard Electronic Code Book) encryption routine and a key length of 56 bits. However, it is appreciated that other well-known and commercially. available encryption routines and different key lengths may be used in accordance with the present invention.

In the present embodiment, A/V decode block 540 includes a decryption engine (not shown) for decrypting an encrypted digital broadcast signal 570. However, it is appreciated that the decryption engine may be incorporated elsewhere in transceiver 450, downstream of the encryption engine. The output of the decryption engine is a decrypted digital signal that is "in the clear." The signal in the clear is decoded by A/V decode block 540.

In the present embodiment, A/V decode block 540 decodes the video content and the audio content of digital broadcast signal 570 using an MPEG (Moving Pictures Experts Group) video decoder and an AC3 (Digital Dolby) audio decoder; however, it is appreciated that other video or audio decoders can be used in accordance with the present invention. In addition, in one embodiment, A/V decode block 540 is capable of handling video and audio analog signals.

The inputs to graphics block 550 are the decoded video and audio digital signals from A/V decode block 540. In one embodiment, graphics block 550 also receives external audio and video analog inputs. Graphics block 550 processes the audio and video information and provides the output to, for example, a television set or a computer system (not shown) where it can be viewed and listened to.

Figure 5B:
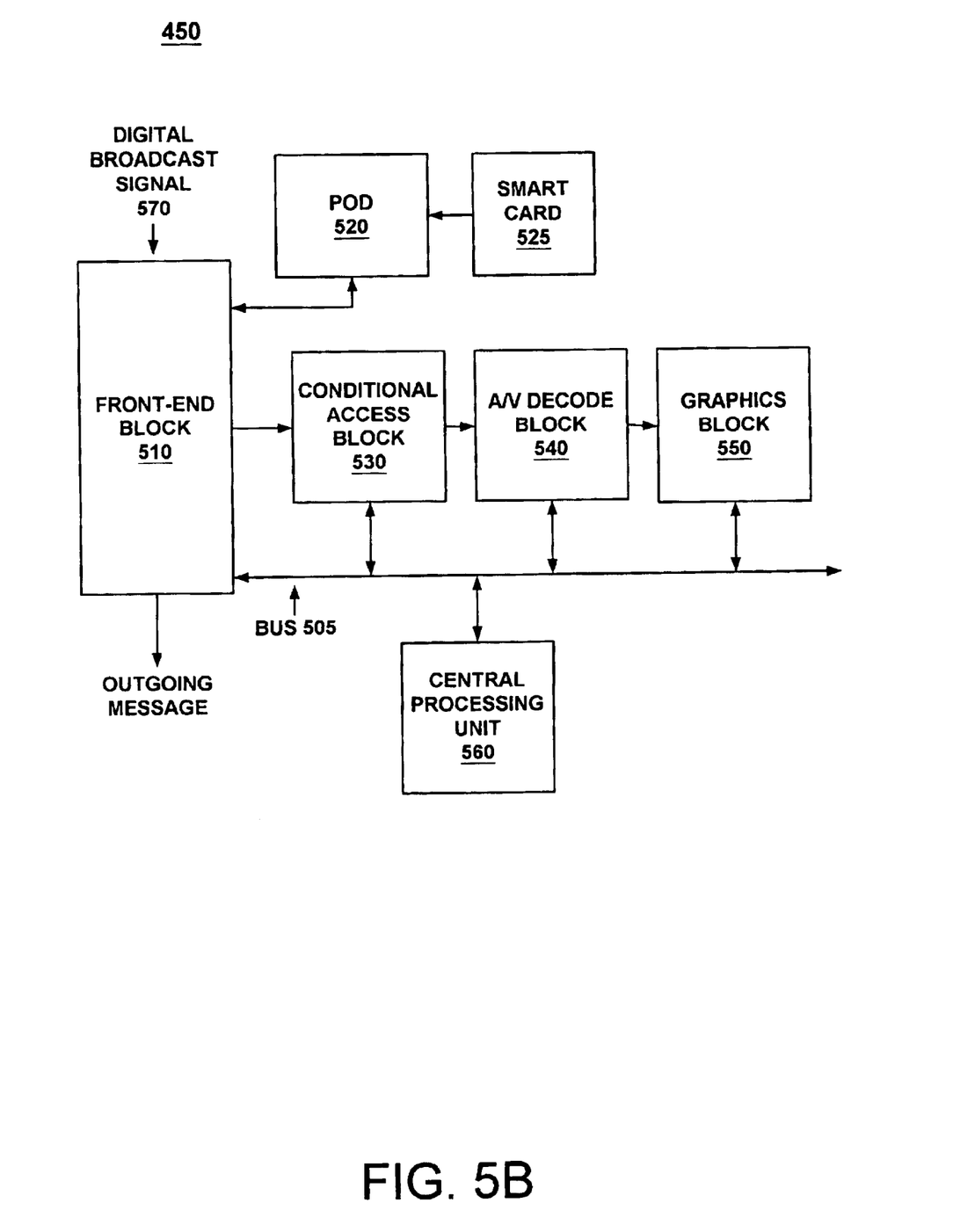
FIG. 5B is a block diagram of another embodiment of an intelligent bi-directional transceiver upon which embodiments of the present invention may be practiced.

FIG. 5B is a block diagram of another embodiment of transceiver 450 upon which embodiments of the present invention may be practiced. In this embodiment, point of deployment (POD) 520 is separate from conditional access block 530, and smart card 525 is plugged into POD 520 instead of conditional access block 530. Smart card 525 implements the scramble key for descrambling digital broadcast signal 570, and this key is used by POD 520 to descramble digital broadcast signal 570. POD 520 also encrypts digital broadcast signal 570 using an encryption engine (not shown). Although POD 520 is separate from conditional access block 330 in this embodiment, conditional access block 530 can still exist in transceiver 450.

Figure 6:
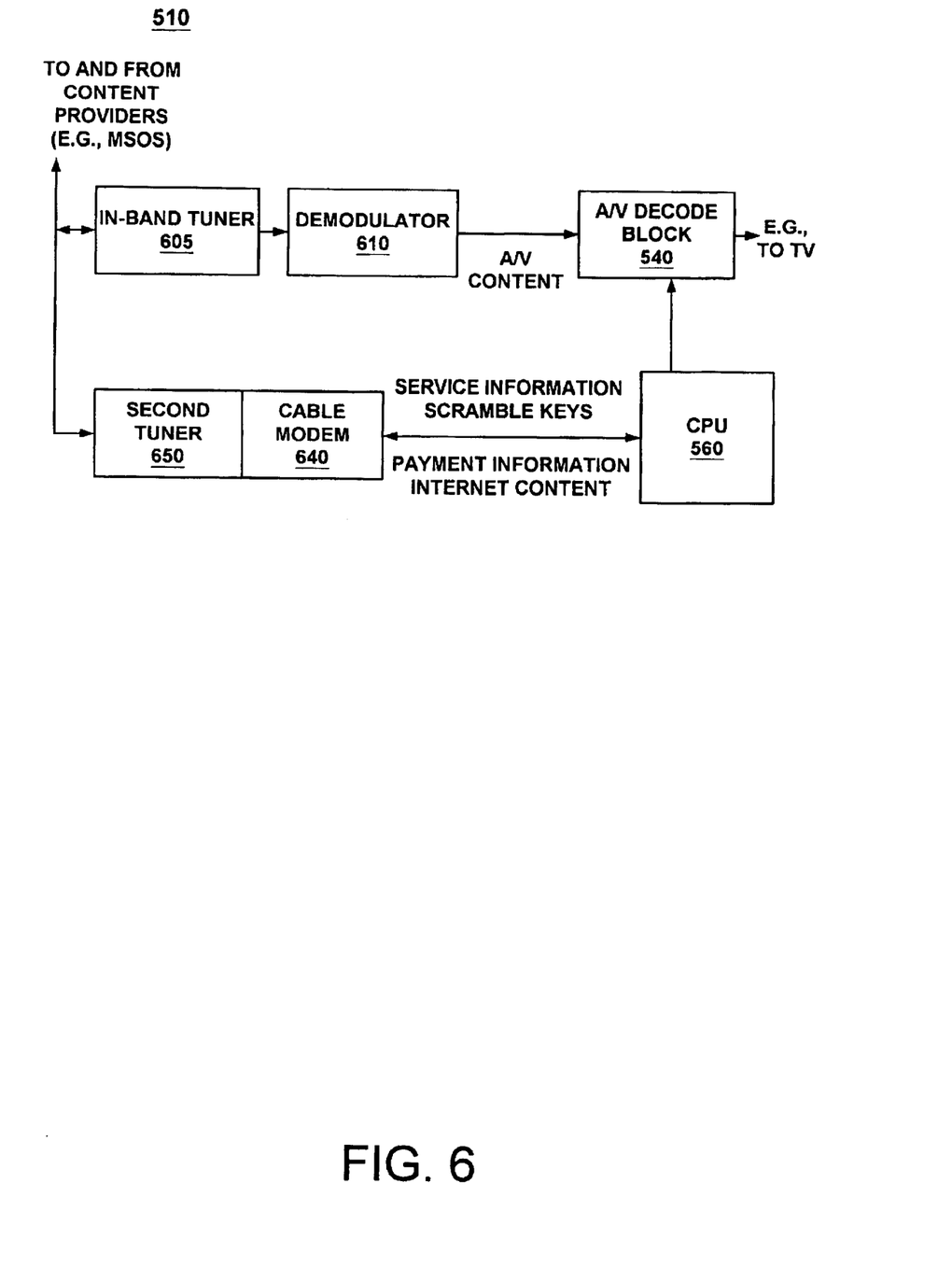
FIG. 6 is a block diagram of one embodiment of an intelligent bi-directional transceiver in accordance with the present invention.

FIG. 6 is a block diagram of one embodiment of an intelligent bi-directional transceiver (specifically, front-end block 510) in accordance with the present invention. Central processing unit (CPU) 560 contains a processor and memory (not shown) for processing information and instructions used by transceiver 450 (FIGS. 5A and 5B).

With reference to FIG. 4 and FIG. 6, in the present embodiment, front-end block 510 includes an in-band tuner 605 for receiving the in-band downstream signals from A/V content provider 430. The in-band downstream signal is demodulated by demodulator 610, then forwarded to A/V decode block 540 for decoding. From A/V decode block 540, the decoded signal is sent to a graphics block (e.g., graphics block 550 of FIGS. 5A and 5B) for processing so that it can be displayed and/or listened to.

Continuing with reference to FIG. 4 and FIG. 6, in the present embodiment, front-end block 510 also includes cable modem 640 and a second tuner 650 (e.g., a Multiple Cable Network System Forward Application Tuner) for sending and receiving information to and from the World Wide Web, for sending and receiving e-mail, and for exchanging information with the digital broadcast system (e.g., service information to generate and update an EPG, billing information pertaining to premium services such as pay-per-view movies and events, etc.).

In accordance with the present embodiment of the present invention, transceiver 450 receives A/V content via the in-band signals using in-band tuner 605, and service information and the scramble key via the World Wide Web (e.g., the Internet) using cable modem 640 and second tuner 650. In one embodiment, transceiver 450 receives service information via the in-band signals using in-band tuner 605, instead of over the World Wide Web.

The scramble key can be applied to the in-band downstream signal containing the A/V content to descramble that signal and retrieve the A/V content (when the in-band downstream signal is scrambled, such as for a pay-per-view movie or event). The service information (if compressed) is decoded by A/V decode block 540, then sent to graphics block 550 (FIGS. 5A and 5B) for processing so that the electronic programming guide can be displayed using a television or computer system, for example. Messages from transceiver 450, such as a selection of a pay-per-view movie or event and the associated billing information, are sent to the MSO via cable modem 640.

In one embodiment, an authentication signal is sent from cable modem 640 to the MSO to indicate that a valid set-top box is connected to broadcast system 400 (FIG. 4). That is, the authentication signal is used to indicate that intelligent transceiver 450 (FIGS. 5A and 5B) is the correct and authorized recipient of the scramble key, thereby discouraging theft of the scramble key at the outlet of cable modem 640.

Figure 7:
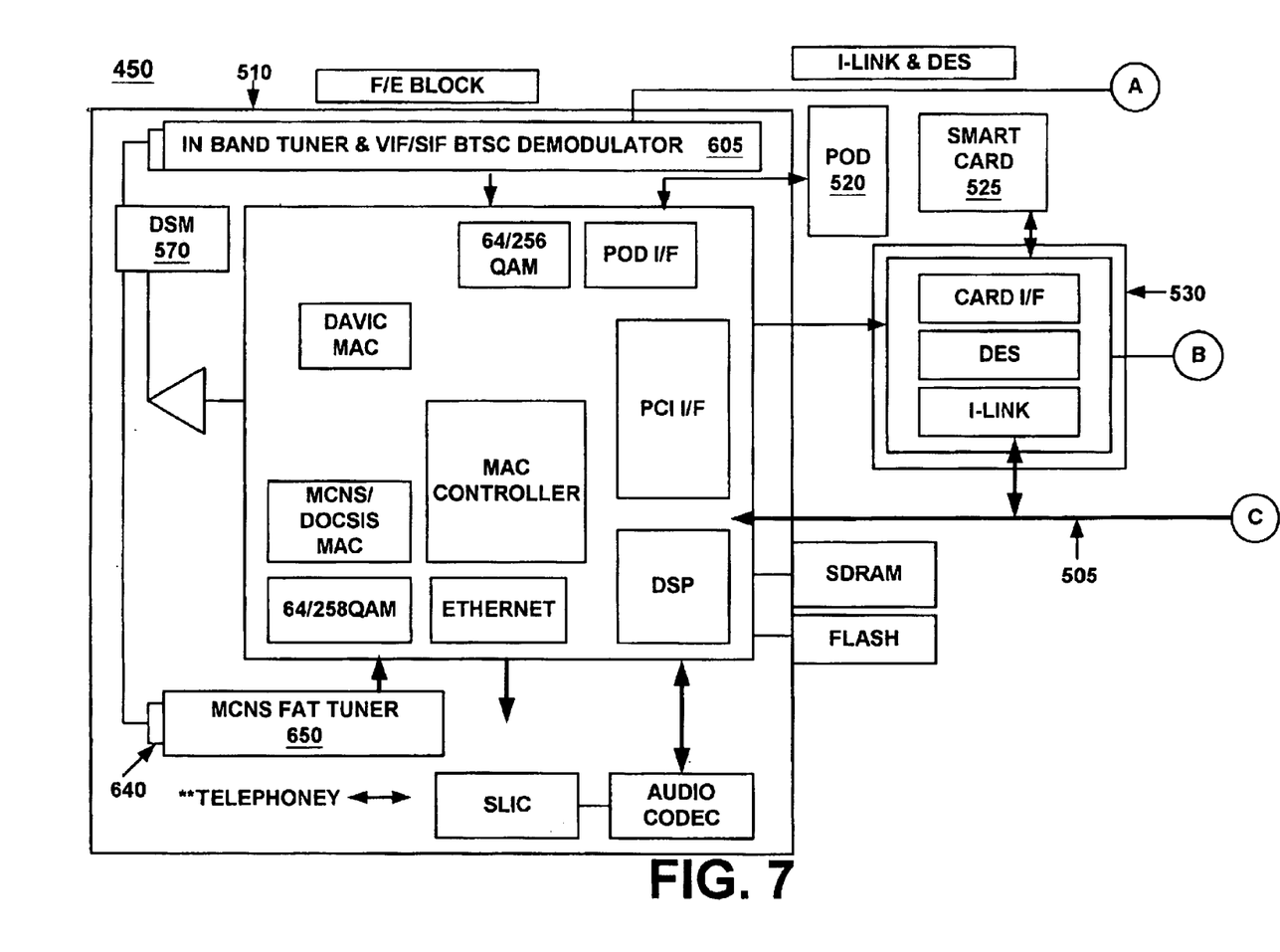
FIG. 7 is a block diagram providing further details of the embodiments of the intelligent transceiver of FIGS. 5A and 5B in accordance with the present invention.

FIG. 7 is a block diagram of an intelligent transceiver 450 (e.g., a bi-directional set-top box) showing additional details of the embodiments illustrated by FIGS. 5A and 5B. Table 1 is a list of the various elements and acronyms contained in FIG. 7.

TABLE 1

Elements and Acronyms of Intelligent Transceiver Embodied in FIG. 7

| | |
|---|---|
| AVDAC | Audio Video Digital-to-Analog Converter |
| BTSC | Broadcast Television Systems Committee |
| D-Cache | Data Cache |
| DAVIC | Digital Audio Video Council |
| DOCSIS | Data Over Cable Service Interface Specification |
| DSM | Diplexer, Splitter Module |
| DSP | Digital Signal Processor |
| DVD | Digital Video Disk |
| FAT | Forward Application Tuner |
| FPU | Floating Point Unit |
| I/F | Interface |
| IDCT | Inverse Discrete Cosine Transform |
| Inst. Cache | Instruction Cache |
| Int. Cont. | Interrupt Controller |
| MAC | Media Access Control |
| MC | Motion Compensation |
| MCNS | Multiple Cable Network System |
| MIDI | Musical Instrument Digital Interface |
| MP@ML | Main Profile at Main Level |
| PCI | Peripheral Component Interconnect |
| PCM | Pulse Coded Modulation |
| PLL | Phase Locked Loop |
| RTC | Real Time Clock |
| SLIC | Serial Line Internet Connection |
| UART | Universal Asynchronous Receiver-Transmitter |
| VBI | Vertical Blanking Interval |
| VIF/SIF | Video Intermediate Frequency/Sound Intermediate Frequency |

With reference to FIG. 7, in the present embodiment, front-end block 510 receives a scrambled digital broadcast signal (e.g., digital broadcast signal 570). Front-end block 510 includes in-band tuner 605, and cable modem 640 and second tuner 650. In-band tuner 605 is utilized for receiving in-band digital signals containing A/V content. In accordance with the present invention, cable modem 640 and second tuner 650 are utilized for receiving the scramble key from the Internet. In one embodiment, cable modem 640 and second tuner 650 also are used to receive service information (EPG information) via the Internet. In another embodiment, the service information is instead received by in-band tuner 605.

Smart card 525 implements the scramble key that is used to descramble a scrambled digital broadcast signal. It is appreciated that FIG. 7 shows, in a combined form, both of the embodiments illustrated by FIGS. 5A and 5B. In the case of the embodiment illustrated by FIG. 5A, smart card 525 is inserted into interface card 530, and interface card 530 descrambles and encrypts the digital broadcast signal. In the case of the embodiment illustrated by FIG. 5B, smart card 525 is plugged into POD 520. In this latter embodiment, the descrambling and encrypting functions are performed in POD 520, and so these functions are bypassed in interface card 530.

With reference to FIG. 7, the encrypted digital signal is delivered to A/V decode block 540 via conditional access block 530. In the present embodiment of the present invention, a decryption engine (not shown) is integrated into demultiplexer ("demux") 710. The decryption engine decrypts an encrypted signal (e.g., digital broadcast signal 570) received by A/V decode block 540 via conditional access block 530.

Continuing with reference to FIG. 7, in the present embodiment, A/V decode block 540 includes an MPEG decoder (e.g., MP@ML DEC block 711) and an audio decoder (e.g., AC-3 block 712) to decode the video and audio content of digital broadcast signal 570. Graphics block 550 processes the audio and video information received from A/V decode block 540. Central processing unit 560 contains a processor (e.g., CPU core 730) and memory (e.g., instruction cache 720) for processing information and instructions used by intelligent transceiver 450.

Figure 8:
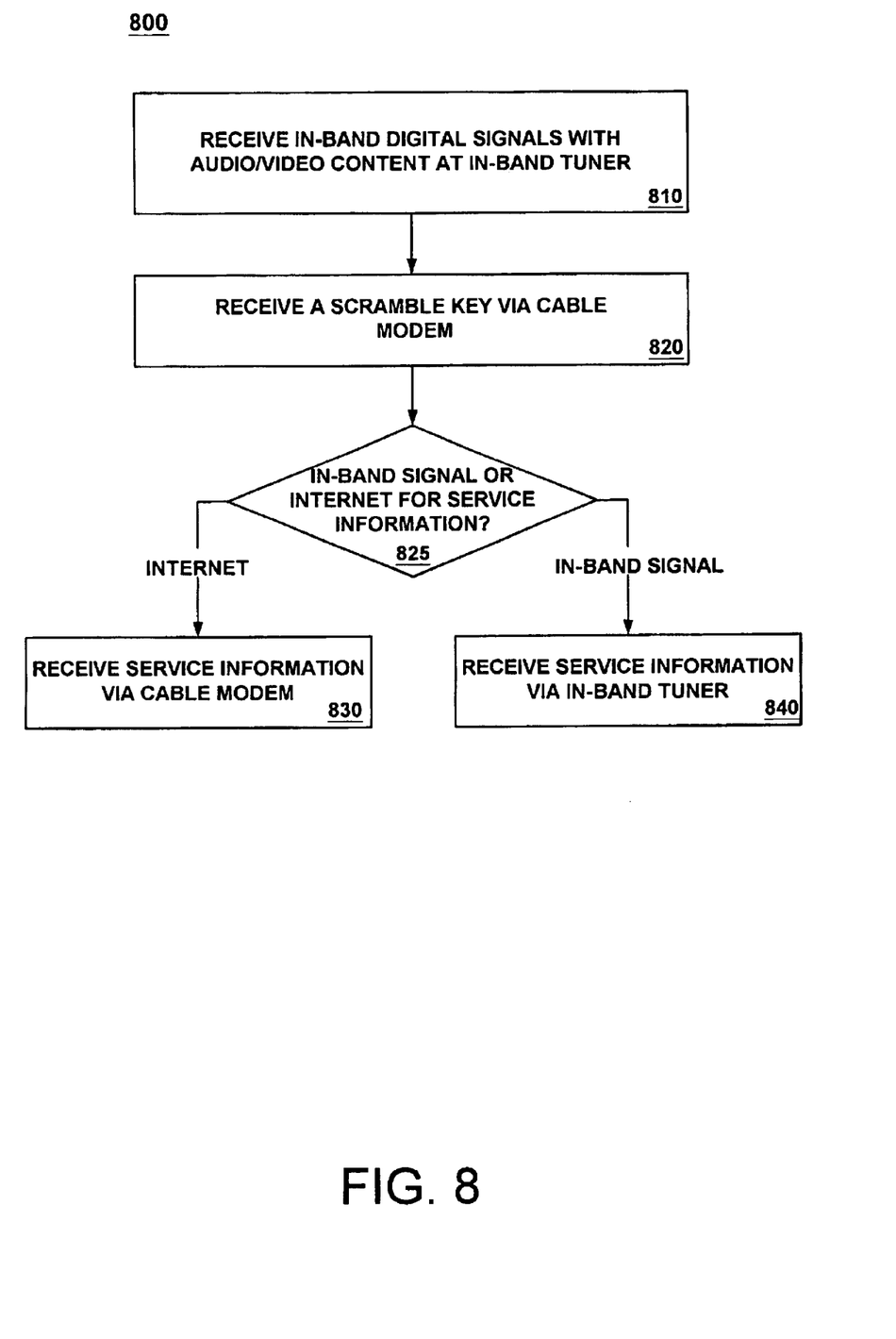
FIG. 8 is a flowchart of the steps in a process for transmitting and receiving digital signals using an intelligent bi-directional transceiver in accordance with one embodiment of the present invention.

FIG. 8 is a flowchart of the steps in a process 800 for sending and receiving digital signals over a bi-directional digital broadcast system (e.g., system 400 of FIG. 4) using an intelligent transceiver (e.g., transceiver 450 of FIGS. 5A, 5B and 7) in accordance with one embodiment of the present invention. In the,present embodiment, process 800 is implemented as program instructions that are stored in memory and executed by a processor (e.g., CPU core 630 of FIG. 6) of transceiver 450. It is appreciated that process 800 may be utilized in devices other than transceiver 450.

In step 810 of FIG. 8, in-band digital signals containing audio/video content are transmitted from broadcast system 400 (FIG. 4) and received by transceiver 450 via in-band tuner 605 (FIG. 6). The signal can then be demodulated, decoded and processed so that it can be displayed and/or listened to using a television set, a computer system, or the like.

In step 820 of FIG. 8, a scramble key is transmitted by broadcast system 400 and received by transceiver 450 via cable modem 640 and second tuner 650 (FIG. 6). In the present embodiment, the scramble key is communicated over the World Wide Web using Internet Protocol. The scramble key can used by transceiver 450 to descramble a scrambled digital signal, such as the in-band digital signal containing A/V content, when that signal is scrambled.

In step 825 of FIG. 8, service information (such as information used to generate and update an electronic programming guide) can be transmitted by broadcast system 400 either using in-band digital signals or over the Internet using, for example, Internet Protocol.

In step 830, if the service information is transmitted over the Internet, then it is received by transceiver 450 via cable modem 640 and second tuner 650 (FIG. 6). The service information can be decoded (if it. is compressed), then processed so that it can be displayed using a television set, a computer system, or the like.

In step 840, if the service information is transmitted in an in-band digital signal, then it is received by transceiver 450 via in-band tuner 605 (FIG. 6). The service information can be decoded (if it is compressed), then processed so that it can be displayed using a television set, a computer system, or the like.

In summary, in accordance with the present invention, an out-of-band signal is not used to send the service information (EPG information) and the scramble key from broadcast system 400 to set-top boxes 450a, 450b, 450c, 450d and 450e (FIG. 4). Instead, the scramble key is sent from broadcast system 400 over the Internet (World Wide Web). In one embodiment, the service information is also sent over the Internet. In another embodiment, the service information is sent using in-band downstream digital signals. A/V content is also sent using in-band downstream digital signals. By eliminating the out-of-band signal, the complexity of a broadcast system architecture can be reduced in accordance with the present invention, reducing associated costs for the MSO and ultimately for the consumer. Set-top box designs can also be simplified by removing the out-of-band tuner, further reducing consumer costs by reducing development and manufacturing costs for the set-top box manufacturer.

Thus, the present invention provides an apparatus and method thereof that can reduce the costs of a set-top box and a broadcast system, in particular those costs associated with supporting the use of in-band signals, out-of-band signals and IP data packets, while continuing to provide the audio/video content, service information, scramble key, and Internet access currently provided by the in-band signals, out-of-band signals and IP data packets.

The preferred embodiment of the present invention, improved Internet set-top box having an in-band tuner and cable modem, is thus described. While the present invention has been described in particular embodiments, it should be appreciated that the present invention should not be construed as limited by such embodiments, but rather construed according to the below claims.

What is claimed is:

1. An intelligent transceiver comprising:
   a bus;
   a modular front-end block coupled to said bus, said modular front-end block comprising:
      an in-band tuner adapted to receive from a digital broadcast system in-band digital signals comprising audio content and video content; and
      a second tuner for receiving digital signals via the Internet, wherein digital signals received via said second tuner comprise a scramble key used in descrambling a scrambled digital signal;
   a modular conditional access block coupled to said bus, said modular conditional access block adapted to descramble said scrambled digital signal; and
   a plurality of other modular functional blocks coupled to said bus, said other modular functional blocks comprising a central processing unit and functional units adapted to decode said audio and video content and to generate an output audio/video signal for rendering on a display device; wherein said in-band tuner and said second tuner communicate with said other modular functional blocks via said bus using a shared bus interface and bypassing said modular conditional access block.

2. The intelligent transceiver of claim 1 wherein said in-band digital signals received by said in-band tuner further comprise service information used to generate an electronic programming guide.

3. The intelligent transceiver of claim 1 wherein said modular front-end block further comprises a cable modem coupled to said second tuner, wherein said digital signals received via the Internet are received by said second tuner via said cable modem and wherein said digital signals received by said cable modem further comprise service information used to generate an electronic programming guide.

4. The intelligent transceiver of claim 3 wherein said service information and said scramble key are communicated using Internet Protocol over the World Wide Web.

5. The intelligent transceiver of claim 3 wherein said modular front-end block is further adapted to send an authentication signal to said digital broadcast system, said authentication signal for indicating that said intelligent transceiver is authorized to receive said scramble key.

6. The intelligent transceiver of claim 3 wherein said modular front-end block is further adapted to send billing information to said digital broadcast system.

7. The intelligent transceiver of claim 1 further comprising:
an input/output device for sending and receiving digital signals via a telephone connection.

8. A bi-directional digital broadcast system comprising:
a bus;
a modular front-end block coupled to said bus, said modular front-end block comprising:
an in-band tuner for receiving in-band digital signals comprising scrambled audio content and scrambled video content;
a second tuner; and
a cable modem coupled to said second tuner, wherein said second tuner is for receiving digital signals from the Internet via said cable modem, wherein digital signals received via said second tuner comprise a scramble key used in descrambling a scrambled digital signal;
a descrambler coupled to said bus, said descrambler for descrambling said scrambled audio content and said scrambled video content, said descrambler for implementing said scramble key;
a decoder coupled to said bus, said decoder for decoding audio and video content;
an audio and video processing block coupled to said bus, said audio and video processing block for generating audio and video that are output to a display device; and
a central processing unit coupled to said bus; wherein said in-band tuner and said second tuner communicate with said decoder, said audio and video processing block and said central processing unit over said bus and a shared bus interface, bypassing said descrambler.

9. The bi-directional digital broadcast system of claim 8 wherein said in-band digital signals received by said in-band tuner further comprise service information used to generate an electronic programming guide.

10. The bi-directional digital broadcast system of claim 8 wherein said digital signals received via said cable modem further comprise service information used to generate an electronic programming guide.

11. The bi-directional digital broadcast system of claim 10 wherein said service information and said scramble key are communicated using Internet Protocol over the World Wide Web.

12. The bi-directional digital broadcast system of claim 8 wherein said modular front-end block further comprises an input/output device for receiving and sending digital signals via a telephone connection.

13. The bi-directional digital broadcast system of claim 8 wherein an authentication signal is sent by said modular front-end block, said authentication signal for indicating said modular front-end block is authorized to receive said scramble key.

14. The bi-directional digital broadcast system of claim 8 wherein billing information is sent by said modular front-end block.

15. An intelligent transceiver comprising:
a bus;
a modular front-end block coupled to said bus, said modular front-end block comprising:
an in-band tuner; and
a second tuner;
a modular conditional access block coupled to said bus, said modular conditional access block adapted to descramble a scrambled digital signal; and
a plurality of other modular functional blocks coupled to said bus, said other modular functional blocks comprising a central processing unit and functional units adapted to decode audio and video content and to generate an output audio/video signal for rendering on a display device; wherein said in-band tuner and said second tuner communicate with said other modular functional blocks via said bus using a shared bus interface and bypassing said modular conditional access block; wherein said intelligent transceiver executes a method for receiving digital signals within a bi-directional digital broadcast system, said method comprising the steps of:
a) receiving in-band digital signals comprising scrambled audio and video content, said step a) performed by said in-band tuner; and
b) receiving a digital scramble key via the Internet using said second tuner coupled to a cable modem of said intelligent transceiver, said digital scramble key used in descrambling a scrambled digital signal.

16. The intelligent transceiver of claim 15 wherein said step a) of said method further comprises the step of:
a1) receiving service information at said in-band tuner, said service information used to generate an electronic programming guide.

17. The intelligent transceiver of claim 15 wherein said step b) of said method further comprises the step of:
b1) receiving service information at said second tuner via said cable modem, said service information used to generate an electronic programming guide.

18. The intelligent transceiver of claim 17 wherein said step b1) of said method comprises:
communicating said service information and said digital scramble key using Internet Protocol over the World Wide Web.

19. The intelligent transceiver of claim 15 wherein said method further comprises the step of:
c) receiving and sending digital signals via a telephone connection using an input/output device of said intelligent transceiver.

20. The intelligent transceiver of claim 15 wherein said method further comprises the step of:

d) sending an authentication signal from said intelligent transceiver, said authentication signal for indicating said intelligent transceiver is authorized to receive said digital scramble key.

21. The intelligent transceiver of claim 15 wherein said method further comprises the step of:

e) sending billing information from said intelligent transceiver.

22. The intelligent transceiver of claim 18 wherein said method further comprises the steps of:

f) descrambling said scrambled audio and video content;

g) decoding output of said descrambler using a decoder; and h) rendering output of said decoder for display on a display device.

* * * * *